US00RE36387E

United States Patent [19]

Rosenberg et al.

[11] E Patent Number: Re. 36,387

[45] Reissued Date of Patent: Nov. 9, 1999

[54] PERCUSSION INPUT DEVICE FOR PERSONAL COMPUTER SYSTEMS

[75] Inventors: Louis B. Rosenberg, Pleasanton; Bernard G. Jackson, Atherton, both of Calif.

[73] Assignee: Immersion Corporation, San Jose

[21] Appl. No.: 08/886,820

[22] Filed: Mar. 10, 1997

Related U.S. Patent Documents

Reissue of:

[64] Patent No.: 5,438,529
Issued: Aug. 1, 1995
Appl. No.: 08/187,597
Filed: Jan. 26, 1994

[51] Int. Cl.[6] ..... G01L 05/00; G06F 03/00

[52] U.S. Cl. ..... 702/139; 73/781; 702/41; 702/42; 702/138

[58] Field of Search ..... 73/781; 364/558, 364/709.1; 702/41, 42, 138, 139

[56] References Cited

U.S. PATENT DOCUMENTS

| | | | |
|---|---|---|---|
| 3,657,926 | 4/1972 | Munson et al. | 73/713 |
| 4,541,288 | 9/1985 | Kornrumpf et al. | 73/862.69 |
| 4,581,972 | 4/1986 | Hoshino | 84/1.14 |
| 4,725,817 | 2/1988 | Wihlborg | 340/365 |
| 4,731,694 | 3/1988 | Grabner et al. | 361/280 |
| 4,753,146 | 6/1988 | Seiler | 84/1.01 |
| 4,924,741 | 5/1990 | Vollenweider | 84/730 |
| 4,947,725 | 8/1990 | Nomura | 84/723 |
| 5,008,497 | 4/1991 | Asher | 178/18 |
| 5,053,585 | 10/1991 | Yaniger | 178/18 |
| 5,056,403 | 10/1991 | Yamashita | 84/723 |
| 5,062,341 | 11/1991 | Reiling et al. | 84/702 |
| 5,105,710 | 4/1992 | Rothmel | 84/730 |
| 5,115,706 | 5/1992 | Aluisi | 84/723 |
| 5,139,261 | 8/1992 | Openiano | 273/148 |
| 5,140,889 | 8/1992 | Segan et al. | 84/723 |
| 5,181,030 | 1/1993 | Itaya et al. | 341/20 |
| 5,184,120 | 2/1993 | Schultz | 340/870.38 |
| 5,223,658 | 6/1993 | Suzuki | 84/663 |
| 5,241,308 | 8/1993 | Young | 341/34 |
| 5,748,114 | 5/1998 | Koehn | 341/22 |

*Primary Examiner*—Edward R. Cosimano
*Attorney, Agent, or Firm*—James R. Riegel

[57] ABSTRACT

A percussion system including at least one force transducer developing a variable resistance output based upon a force exerted upon its surface, an interface providing an interface output based upon the analog output of the force transducer, and a digital processing system coupled to the interface. The analog input is preferably a variable resistance, and the interface output is preferably a pulse having a width related to the variable resistance. The interface preferably includes a capacitive member to form an RC circuit with the force transducer, and circuitry responsive to the RC circuit to produce a digital output. The digital processing system stores the digital output of the interface in memory and processes the digital output with other digital outputs of the interface to perform a computer implemented process such as producing a synthesized drum sound. The percussion device preferably includes a transducer element sandwiched between two elastomeric members which are configured and sized to operate both as a percussive input device and as a mouse pad for the personal computer system.

36 Claims, 9 Drawing Sheets

MEMORY REGISTER (MR)

| X | X | X | X | X | X | O/I | O/I |
|---|---|---|---|---|---|---|---|
| 7 | 6 | 5 | 4 | 3 | 2 | 1 | 0 |

PERCUSSION INPUT DEVICE FOR PERSONAL COMPUTER SYSTEMS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates generally to electronic musical instruments, and more particularly to percussion input devices for personal computers.

2. Description of the Related Art

Musical instruments have traditionally been mechanical in nature. For example, string instruments (such as violins and guitars) produce musical notes due to the mechanical vibration of their strings. Wind instruments (such as the clarinet or saxophone) produce musical notes by the mechanical vibration of a reed and by the amplification of the tone produced by the reed within resonance chambers of the instrument. Percussion instruments (such as drums and cymbals) produce percussive sounds through the mechanical vibration of a membrane or other percussive surface.

With the advent of the electronics age, a number of musical instruments have been electronically synthesized. Among the first of the musical synthesizers is the MOOG™ synthesizer first developed in the early 1960's which produced various musical sounds by mixing a number of analog signals together. Later, with the advent of inexpensive digital processing, digitally synthesized musical instruments began to appear.

One type of digitally synthesized musical instrument is the electronic drum pad or drum set. An electronically synthesized drum pad includes a force sensor, digital electronics coupled to the force sensor, an audio amplifier, and a loudspeaker. When a musician beats upon the drum pad with a drumstick or other object, the digital electronics synthesizes a drum signal which is amplified and played on the loudspeaker.

Electronically synthesized drum pads of the prior art fall into two general categories. In the first category, the drum pads are integrated with dedicated digital synthesis electronics. This type of electronically synthesized drum pad is convenient, but tends to be less flexible and more limited in capability. A second category of electronically synthesized drum pads uses an external digital processing system which may be a general purpose music synthesizer, or which may be a general computer system such as a personal computer system.

The electronic drum pads of the prior art tend to be complex and quite expensive. For example, electronic drum pads of the prior art are typically provided with driver electronics which support a MIDI interface bus to interface with a music synthesizer or personal computer system. These interfaces require a significant amount of digital circuitry (e.g. a microprocessor or other logic device) and have substantial memory requirements (e.g. SRAM) and, therefore, these interfaces typically have more than a trivial cost.

An additional problem with prior art drum pads that work in conjunction with personal computers is that they occupy valuable desk-space. Since most personal computers now utilize a mouse or other type of pointing device, it can be difficult to provide both a mouse pad and a drum pad on a desk next to the personal computers. Since drum pads of the prior art tend to be small and round, they are unsuitable for use as a mouse pad.

Furthermore, drum pads of the prior art tend to be dedicated for musical purposes. It would be desirable to have a drum pad that can serve multiple purposes, such as a game input, selector switch input, etc. to a personal computer system.

SUMMARY OF THE INVENTION

The present invention provides a percussion input device for personal computers which is both inexpensive and versatile. The percussion input device (drum pad) and personal computer together form a percussion system which is also inexpensive and versatile. Furthermore, the percussion input device can replace a mouse pad associated with the personal computer, thereby increasing free desk space.

A percussion system in accordance with the present invention includes at least one force transducer, an interface, and a digital processing system including digital memory. The force transducer develops a variable resistance (i.e. an analog output) output based upon the level of force exerted upon its surface. The interface has an input coupled to the force transducer and to a capacitive member. The force transducer and capacitive member together form an RC circuit which can be charged by the interface. An interface develops an output pulse having a width that is related to the force exerted on the transducer. The digital processing system is coupled to the output of the interface and can store the digital output in a memory location to indicate that a force above a certain threshold is being exerted on the surface of the force transducer.

A percussion input device in accordance with the present invention is adapted for use with personal computers and includes a transducer element provided with a pair of nodes, an elastomeric member mechanically coupled to and covering the transducer element, a cable having a number of mutually insulated conducting wires, where first ends of a pair of the wires are coupled to the pair of nodes of the transducer element, and a connector having a number of conductive connector pins, where two of the connector pins are coupled to second ends of the pair of wires. Preferably, the elastomeric member is a first elastomeric member, and a second elastomeric member that is shaped similarly to the first elastomeric member is attached to a lower surface of the transducer element. The structure therefore preferably sandwiches the transducer element between the first elastomeric member and the second elastomeric member.

The first elastomeric member is preferably provided with an upper surface which serves as a good surface for an electronic mouse, and the second elastomeric member is preferably provided with a lower surface which provides a good frictional engagement with a supporting surface. Preferably, the first elastomeric member and the second elastomeric members are substantially rectangular in shape, have curved corners, and are suitably sized so that the percussion input device can also serve as a mouse pad.

A percussion system of the present invention also includes a computer system having an I/O bus, a percussion input device which develops an analog output in response to a force being applied to a percussion surface, an interface having an input coupled to the analog output of the percussion input device which provides a digital pulse signal whose duration depends on the applied force, a mechanism for making this digital pulse signal accessible to the I/O bus of the computer system as a bit in a specific I/O register, a mechanism for measuring the duration of the pulse by monitoring the proper bit of the given I/O register in order to measure the applied force, and a mechanism for providing a computer-implemented result upon measuring the pulse duration. As used herein, a preferred type of "analog output" is a variable resistance produced by a variable resistance transducer. Of course, when a current is caused to flow through the variable resistance transducer, this variable resistance transducer will also produce a variable voltage "analog output." Alternatively, an "analog output" can be produced by a transducer which produces a voltage and/or current directly from the force applied to the transducer.

A mechanism for detecting a change as recited above preferably includes a computer implemented process including the steps of: (a) initializing a current count value and initiating a force-measurement pulse signal; (b) detecting a change in at least one bit of the designated I/O register corresponding to the trailing edge of the force measurement pulse signal; (c) assigning the current count value to a percussion value if the change is detected in at least one bit for the first time since step (a) was last performed; and (d) repeating steps (b) and (c) until the current count reaches a count limit. The mechanism for providing a computer implemented result preferably includes a computer implemented process including: (a) collecting a number of percussion values developed by the mechanism for detecting a change; (b) processing the percussion values to produce a processed resultant; and (c) developing a user-discernible output based upon the processed resultant.

An advantage of the present invention is that a drum pad can be coupled up to a personal computer system by a relatively inexpensive interface to provide a percussion musical instrument. Computer implemented processes of the present invention take the data provided by the drum pad interface to provide a computer implemented result, such as an auditory output, a visual output, etc.

Another advantage of the present invention is that the drum pad is designed to serve both as a percussion input device and as a mouse pad for a personal computer system. This saves valuable desk space that makes it more practical to have a percussion input device associated with a personal computer.

Yet another advantage of the present invention is that the drum pad can be used as an analog triggering device that uses a drum metaphor. For example, the drum pad can be used in conjunction with games, or can be used to advance flames in a computerized slide show.

These and other advantages of the present invention will become apparent upon reading the following detailed descriptions and studying the various figures of the drawings.

DETAILED DESCRIPTION OF THE PREFERRED EMBODIMENTS

Figure 1:
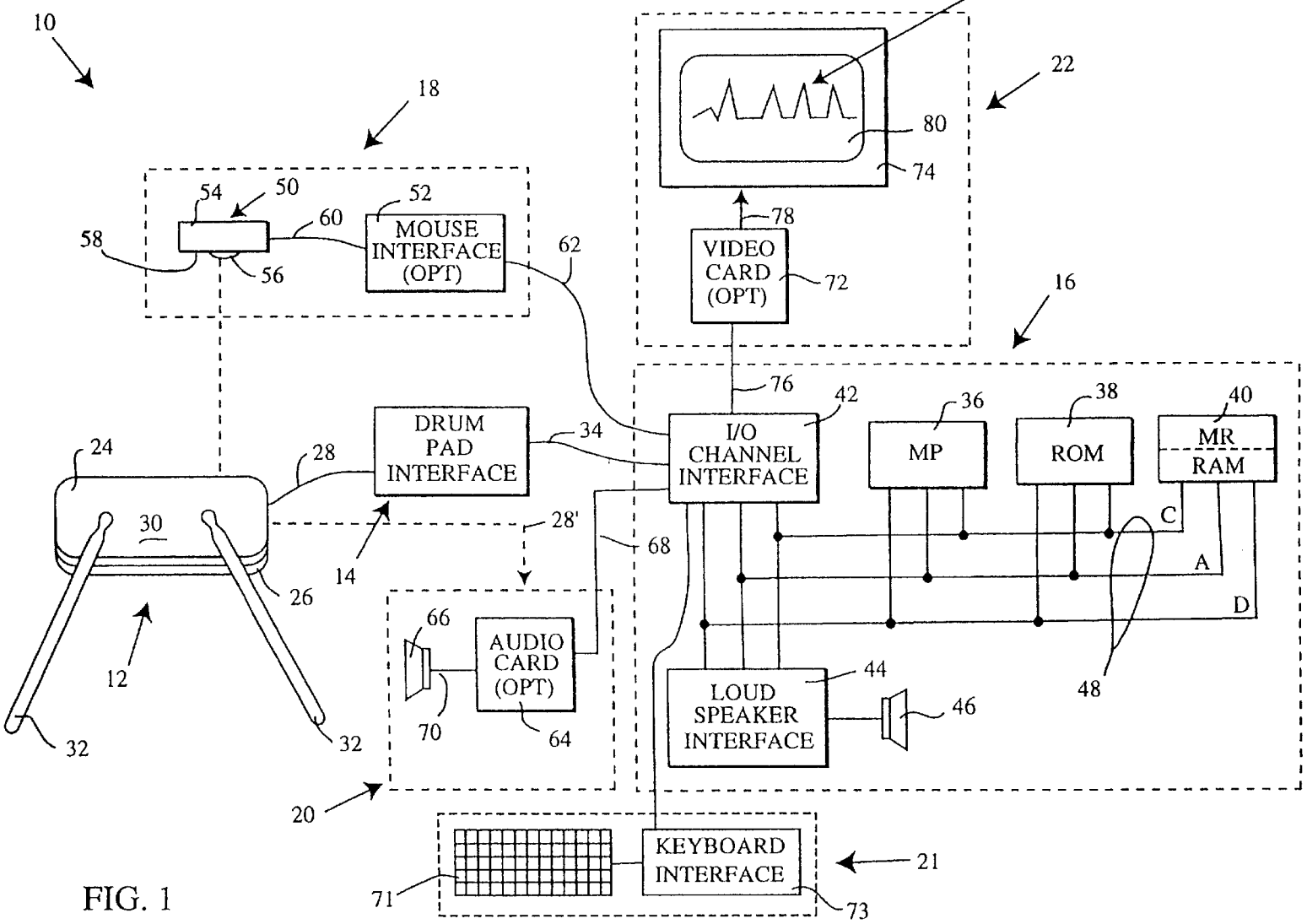
FIG. 1 is a block-diagram view of a percussion system in accordance with the present invention.

FIG. 1 illustrates a percussion system 10 in accordance with the present invention. The percussion system 10 includes a percussion transducer 12, an interface 14, and a digital processing system 16. The percussion system 10 can optionally include a computer mouse system 18, an audio system 20, a keyboard system 21, and a video system 22.

The percussion transducer 12 will sometimes be referred to herein as a "drum pad." The percussion transducer or drum pad 12 preferably includes a first or upper elastomeric member 24, and a second or lower elastomeric member 26. The percussion transducer 12 also includes a cable 28 having a number of mutually insulated conductive wires which can carry analog signals produced by the percussion transducer 12 in response to force on an upper surface 30 of the percussion transducer 12. This force can be accomplished by a number of manners, but in the present embodiment it is preferred that the force is created by one or more drumsticks 32 which strike upper surface 30. As it will be discussed in greater detail subsequently, the percussion transducer 12 is sized and shaped so that it can be used as a mouse pad when it is not being used as a drum pad.

As used herein, a preferred type of "analog output" is a variable resistance produced by a variable resistance transducer of the percussion transducer 12. Of course, when a current is caused to flow through the variable resistance transducer, a variable voltage "analog output" is also produced. Alternatively, an "analog output" can be produced by a transducer which produces a voltage and/or current directly from the force applied to the transducer.

Drum pad interface 14 will be variously referred to herein as an I/O port, an interface, a one-shot and, sometimes, a game port. The purpose of the drum pad interface 14 is to convert the analog resistance value on cable 28 into a digital pulse whose duration depends on the pressure applied to the drum pad and which is input *via communication line 34* into the digital processing system 16.

The digital processing system 16 is preferably a standard personal computer system such as an IBM-compatible AT class personal computer system. More particularly, the digital processing system 16 includes a microprocessor 36, a ROM 38, RAM 40, an I/O channel interface 42, a loudspeaker interface 44, and a loudspeaker 46. The various components 36–44 are coupled together by a local bus 48 including a data bus "D", an address bus "A", and a control bus "C."

The microprocessor 36 is preferably any suitable single chip microprocessor such as an Intel Compatible 80386, 80486, or Pentium class microprocessor. The basic input/output (BIOS) system of the digital processing system 16 is stored in ROM 38. RAM 40 is used as "scratch pad" memory.

The I/O channel interface 42 is preferably an EISA or IBM MCA standard interface controller. A number of interface adaptor cards can be plugged into sockets or "slots" (not shown, but standard on most PCs) coupled to I/O channel interlace 42. One such interface adaptor card is the drum pad interface card 14. The microprocessor 36 accesses different cards by sending different I/O addresses to the I/O channel interface via the address bus. A memory register MR associated with drum pad interface 14 resides in the I/O address space and has a purpose to be discussed subsequently. The memory register MR can reside, in theory, anywhere in the I/O space, but is conventionally chosen to be located at a "game" register at I/O address $201.

The loudspeaker interface 44 is typically provided on the "mother board" (i.e. the main circuit board) of most digital processing systems 16. It is coupled to the local bus 48 and includes both sound and timer circuitry which allows a loudspeaker 46 to be activated to provide a number of sounds. As it is well known to those skilled in the art, information can be placed in the local bus 48 by the microprocessor 36 indicating the duration, pitch, and sometimes waveform and "quality" of the sound to be produced by the loudspeaker 46.

A number of optional or peripheral devices can also be coupled to the digital processing system 16 to be used in conjunction with the percussion system 10. For example, a mouse system 18 including a hand-held mouse 50 and a mouse interface card 52 can be provided in the system 10. As it is well known to those skilled in the art, a mouse 50 includes a small case 54 which encloses the electronics of the mouse, and a small ball 56 which can extends slightly below the bottom surface 58 of the mouse to engage a mouse pad or other suitable surface. Signals generated by the mouse 50 are coupled to the mouse interface 52 by a cable 60, and digital information for the digital processing system 16 is carried by lines 62 to the I/O channel interface 42. The mouse interface 52 is typically a plug-in card or a special interface adaptor built into the motherboard and coupled to the I/O channel interface circuitry.

As it will be discussed in greater detail subsequently, the percussion transducer 12 is intended to be used as a mouse pad when it is not being used as a drum pad. Because of this, the percussion transducer 12 is sized and shaped to provide a sufficient and suitably configured area for upper surface 30 to engage with a mouse 50. Furthermore, the upper surface 30 of the percussion transducer is preferably made of a material which is selected to provide a good engagement with the ball 56 of the mouse 50 and yet which allows the lower surface 58 of mouse 50 to slide freely across the upper surface 30.

Another optional part of the percussion system 10 is an audio system 20. This audio system includes an audio card interface 64 and a loudspeaker 66. Audio cards such as audio card 64 are available from a number of vendors including Creative Labs, Inc. of Milpitas, Calif. and are typically plug-in cards which engage connectors on the mother board that are coupled to I/O channel interface 42 by lines 68. The microprocessor 36 places data on the local bus 48 which, via I/O channel 42, provides signals on lines 68 that the audio cards 64 uses to produce analog signals on a cable 70 to drive the loudspeaker 66. Therefore, in one embodiment of the present invention, the percussion transducer 12 is coupled to the digital processing system 16 by the drum pad interface 14, and the system 16 outputs sounds via the audio system 20. Alternatively, as implied by the broken line 28' representing a cable carrying an analog signal (here, a continuously variable resistance), the drum pad interface 14 can be built into audio card 64, eliminating the need for a separate drum pad interface 14. In either event, the analog signal (variable resistance) on either cable 28 or 28' is first converted to a digital value, processed by the microprocessor 36, and then acted upon in some computer implemented process to produce a user-discernible result.

Optional keyboard system 21 is provided with most computer systems. The keyboard system 21 includes a keyboard 71 and a keyboard interface 73. The keyboard 71 is coupled to the I/O channel interface 42 via the keyboard interface 73 and appropriate cabling.

Another optional part of percussion system 10 is the video system 22. The video system 22 includes a video card interface 72 coupled to a video monitor 74. Video card interfaces such as video card interface 72 are available from a variety of vendors such as International Business Machines (IBM), Inc. of Armonk, N.Y., and preferably plugs into a connector on the motherboard coupled to the I/O channel interface 42 by lines 76. A cable 78 is used to couple the video card interface 72 to the monitor 74 and allows the digital processing system 16 to make visual displays on the monitor 74. Shown on the screen 80 of monitor 74 are a number of drum beats 82. These drum beats 82 can reflect the same type of signal that would be produced by the loudspeakers 46 or 66, or can represent other signals related to the percussion input, or can represent objects or data being manipulated or triggered by percussion input.

Figure 2:
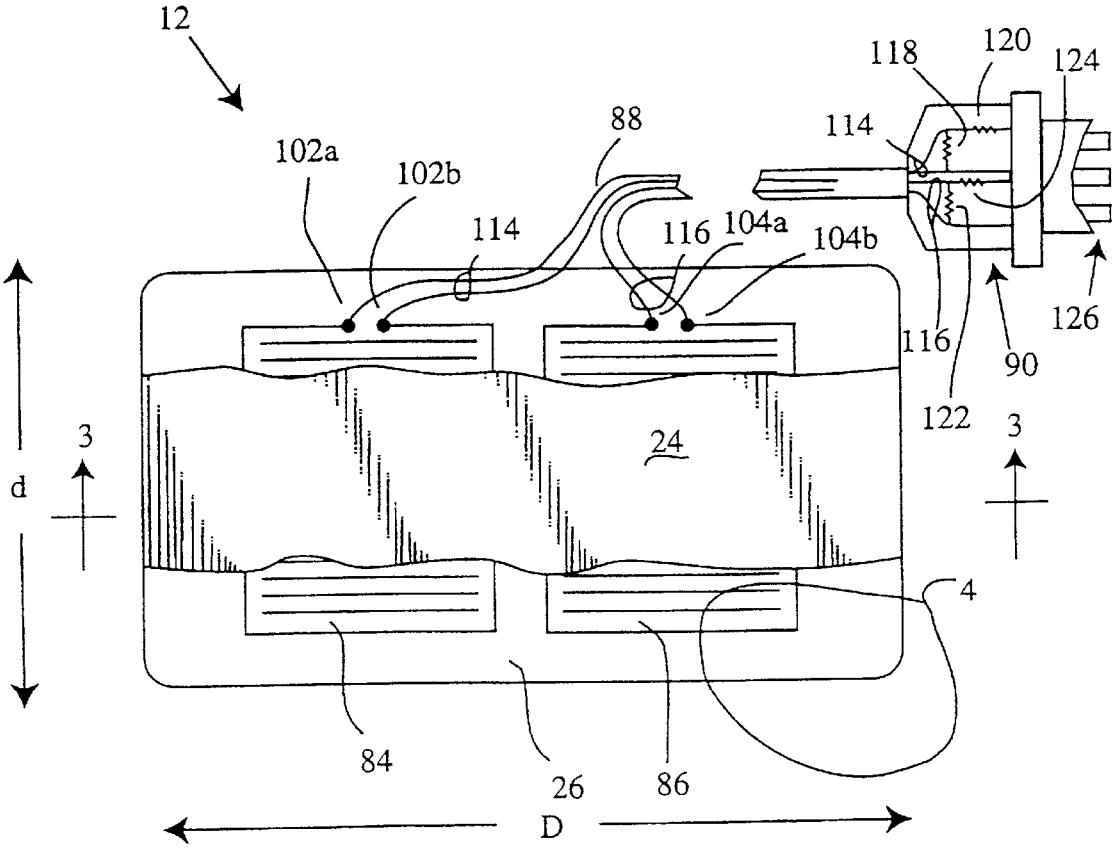
FIG. 2 is a partially broken, top plan view of the drum pad illustrated in FIG. 1.

In FIG. 2, a preferred construction for the percussion transducer 12 is illustrated in greater detail. The percussion transducer 12 includes the first or upper elastomeric member 24, the second or lower elastomeric member 26, a pair of transducer elements 84 and 86, a cable 88, and a connector 90. The first elastomeric member 24 has been partially broken away to provide a better view of the second elastomeric member 26 and the transducer elements 84 and 86.

Figure 3:
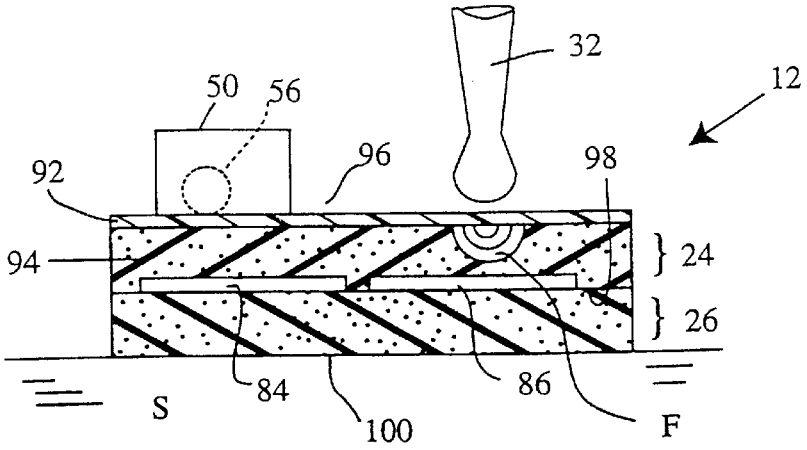
FIG. 3 is a cross-sectional view taken along line 3—3 of FIG. 2.

With additional reference to the cross sectional view of FIG. 3, the first or upper elastomeric member 24 preferably includes an upper section 92 is made from a material that provides an upper surface 96 that is well adapted for engagement with both a mouse 50 and a drumstick 32. The material of upper section 92 is typically Nylon. This material 92 is preferably deformable to allow forces generated by, for example, drumstick 32 against the upper surface to be transmitted through the material of the first elastomeric member 24 to a lower surface 98 of the first elastomeric member 24. The lower section 94 of the elastomeric member 24 is preferably made from a synthetic foam rubber such as open cell rubber, which is readily commercially available. The purpose of lower section 94 is to transmit the force exerted by, for example, drumstick 32 to the lower surface 98 in a substantially linear fashion. This is because the lower section 94 operates, in effect, like a spring within its elastic limits. Therefore, within the elastic limits of the lower section 94, this resilient material will present a force F at the lower surface 98 which is substantially proportional to the force exerted against the upper surface 96. The upper section 92 is preferably permanently attached to the lower section 94 (such as by an adhesive) to provide an integral, unitary, elastomeric member 24.

With continued reference to FIGS. 2 and 3, the second elastomeric member 26 is of a similar size and shape to the first elastomeric member 24. Preferably, the second elastomeric member 26 is made from the same kind of material as the lower section 94 of the first elastomeric member 24. This material will provide the percussion transducer 12 with a resilient base having a bottom surface 100 and makes a good frictional engagement with a support surface S. Alternatively, the second elastomeric member can be of the same construction as the first elastomeric member including an upper section and a lower section. However, it has not been found advantageous to provide an upper section to elastomeric member 26 corresponding to the upper section 92 of the elastomeric member 24 and, therefore, this upper section is not provided in the preferred embodiment for the second elastomeric member 26. The first elastomeric member 24 and the second elastomeric member 26 are preferably adhesively coupled together by any suitable adhesive to provide a unitary structure 12.

Sandwiched between the first elastomeric member 24 and the second elastomeric member 26 are the two transducer elements 84 and 86. The transducer elements 84 and 86 can be purchased commercially from such companies as Interlink Electronics of Camarillo, Calif. These transducer elements (as discussed in greater detail subsequently) preferably have a change in resistance dependent upon the force applied to their upper or lower surface. More particularly, transducer element 84 includes a pair of nodes 102a and 102b, while transducer element 86 includes a pair of nodes 104a and 104b where the resistance between nodes 102a and 102b is dependent upon the force applied to the surface of transducer element 84, and where the resistance between nodes 104a and 104b is dependent upon the force applied to the surface of transducer element 86.

It is important to note that, within the context of a single transducer element, such as within either transducer element 84 or 86, the output of the transducer is location independent with respect to the applied force. In other words, a single transducer element 84 cannot discern where the force which changes the resistance of the transducer element is being applied along its upper surface. The force could be near the middle of the transducer, near the top, near an edge, etc., and substantially the same resistance is present at the output nodes for a given level of force. An individual transducer element is, therefore, a force detector, and not a location detector.

As mentioned previously, the percussion transducer 12 is sized and shaped so as to be useful as a mouse pad. In practice, this means that the transducer is preferably rectangular in shape. A longer dimension D of the transducer is preferably at least 7 inches in length, and is more preferably 9 or 10 inches in length. A shorter dimension d of the transducer 12 is preferably at least 6 inches in length, and is more preferably 7 or 8 inches in length. The corners of the percussion transducer 12 are preferably rounded to prevent a mouse or the hand of a user of a mouse from impacting a sharp corner. The percussion transducer 12 is preferably about ¼ to about ¾ of an inch thick.

As best seen in FIG. 3, the transducer elements 84 and 86 are sandwiched between the first elastomeric member 24 and the second elastomeric member 26. The upper surface of the transducer elements 84 and 86 are therefore mechanically coupled to the lower surface 98 of the elastomeric member 24. It should be noted that this mechanical coupling can be accomplished by simply abutting the upper surface of the transducer elements 84 and 86 against the lower surface 98 of the first elastomeric member 24. Alternatively, they can be mechanically coupled by an adhesive material (not shown due to scale) or as will be seen in a later embodiment, mechanically coupled by an intermediate member.

Figure 4:
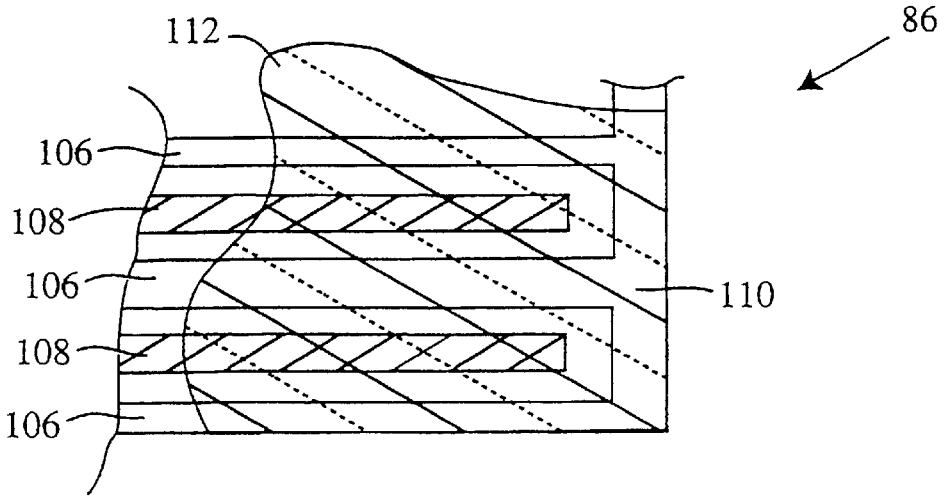
FIG. 4 is an enlarged, detail view of the portion of FIG. 2 encircled by line 4.

As best seen in FIG. 4, a transducer element, such as the portion of transducer element 86 illustrated, includes a number of interleaved fingers made from an electrically conductive foil including a first set of fingers 106 and a second set of fingers 108. As can be seen on the right side of the FIG. 4, the first set of electrical fingers 106 are coupled together by a line 110. The second set of electrical fingers are likewise tied together by a line that would be on the far left side of the transducer element 86 (not seen in this figure). Overlaying the fingers 106 and 108 is a resistance membrane 112. When this resistance membrane is pressed against the fingers 106 and 108 (or vice versa), the resistance between the fingers varies in accordance with the amount of force applied. If no force is applied to resistance membrane 112, the resistance of the output nodes such as output nodes 104a and 104b is in the order of 100 megaohms, while a force of 1 kilogram (kg) applied to membrane 112 drops the resistance between nodes 104a and 104b to about 10 kilohms.

The resistance between the nodes of the transducer element follows a power law in relation to the force applied to the membrane 112. The resistance between the node of the transducer element decreases by a factor of approximately 6 when the applied force increases by a factor of approximately 10. Of course, the power law depends upon the type and configuration of transducer element used. Since this membrane 112 is mechanically coupled to the bottom surface 98 of the first elastomeric member 24, forces applied to the upper surface of a first elastomeric member 24 are transmitted through the upper section 92 and the lower section 94 to the membrane 112 to cause a change of resistance at the nodes 104a and 104b.

The cable 88 includes a number of mutually insulated conductive wires. In this embodiment, at least four conductive wires are provided in two pairs, namely pair 114 and pair 116. First ends of pairs 114 are coupled to the nodes 102a and 102b of the transducer element 84, and first ends of the pair 116 are coupled to the nodes 104a and 104b of the transducer elements 86.

The connector 90 has been partially broken away to illustrate some of the structure of the connector. More particularly, a number of resistors have been provided within housing of connector 90 to form a resistive network in conjunction with the first transducer element 84 and the second transducer element 86. Coupled, in parallel, between the wire pair 114 is a first resistor 118, and coupled in series with one of the wires of pair 114 is a resistor 120. Similarly, coupled, in parallel, between wires 116 is a resistor 122, and coupled in series in one of the wires of pair 116 is a resistor 124. The result of these connections is that, for each transducer element, a resistor is placed in parallel with the transducer element and in series with the transducer element. The outputs of the resistors 120 and 124 and the remaining wires of wire pairs 114 and 116 are connected to connector pins 126 of the connector 90.

Figure 5:
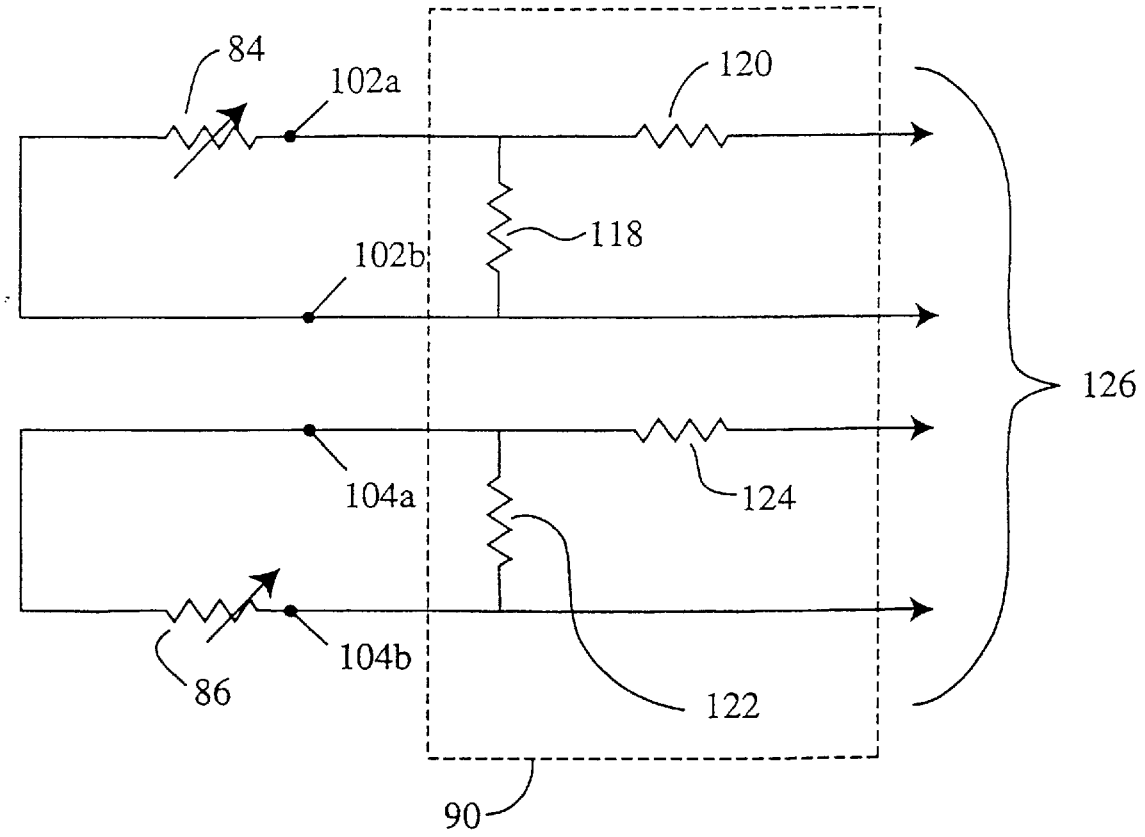
FIG. 5 is an electrical schematic of the drum pad illustrated in FIG. 2.

A electrical circuit which represents the percussion transducer 12 is shown in schematic form in FIG. 5. The variable resistances of transducer elements 84 and 86 are connected in series with resistors 120 and 124, respectively, to pins 126 of connector 90. As used herein, the "variable resistance" of the transducers can be thought of as the "analog output" of those transducers. Parallel or shunt resistor 118 is coupled across nodes 102a and 102b, and parallel or shunt resistor 122 is coupled across nodes 104a and 104b.

The parallel resistors 118 and 122 are typically about 30 kilohms and are used to modify the power law behavior of transducers 84 and 86. Taken as a unit, the parallel combination of transducer 84 and resistor 118 has a resistance that depends more nearly linearly on the force applied to the transducer 84 than does the transducer alone. The same is true of the parallel combination of transducer 86 and resistor 122. The series resistors 120 and 124 are typically about 50 kilohms, and their purpose is to shift the range of resistances produced by typical human-applied pressures on transducers 84 and 86. Taken as a unit, the series combination of resistor 118 and transducer 84 has a resistance that depends basically linearly on the applied force and is also in a suitable resistance range for measurement using the interface to be described in greater detail subsequently. The same comment applies to the series combination of resistor 122 and transducer 84.

While the percussion transducer 12 has been described with regards to a resistive transducer element, it is contemplated that other forms of transducer elements can also be provided. For example, a piezoelectric transducer element can be used. In such an instance, a variable voltage is present at the two output nodes of the transducer element depending on the force applied to the piezoelectric transducer element. Therefore, as used herein, a transducer element can be anyone of a number of types of transducer elements which produces a signal between a pair of output nodes that is dependent upon the force applied to the transducer element.

Figure 6:
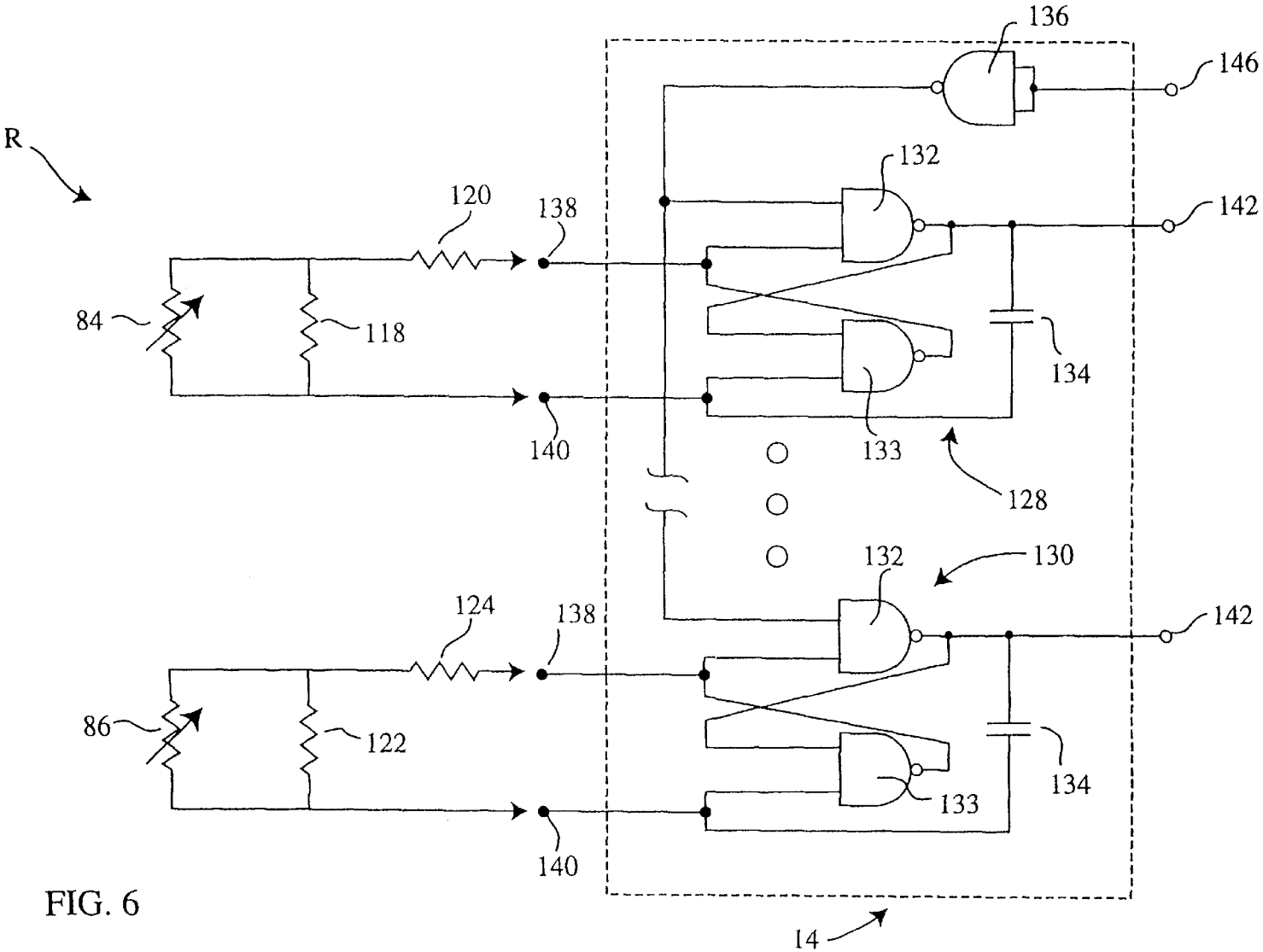
FIG. 6 is an electrical schematic of the drum pad interface and the drum pad illustrated in FIG. 1.

In FIG. 6, a preferred drum pad interface 14 is illustrated in greater detail. This drum pad interface 14 is illustrated with two channels, although it is contemplated that more channels, e.g., four channels, can also be provided by the drum pad interface 14. Alternatively, a drum pad interface can be provided having only one channel. Since in the present embodiment, two channels are used, channels 128 and 130 will be described with reference to FIG. 6. Since the two channels are substantially identical, like reference numerals will refer to like components.

The channels 128/130 each include a pair of NAND gates 132 and 133, and a capacitor 134. The channels 128/130 are triggered by a pulse developed at the output of a NAND gate 136, which has its inputs coupled together to provide the inversion function. The interconnection of these components will be discussed with reference to channel 128, with understanding that the interconnections of channel 130 are substantially the same.

With reference to channel 128 of FIG. 6, NAND gates 132 and 133 are two input NAND gates, where the output of a NAND gate is a logical high (H) unless the two inputs of the NAND gate are a logical H, in which case the output of the NAND gate is a logical low (L). A first input of NAND gate 132 is coupled to the output of NAND gate 136, and a second input of NAND gate 132 is coupled to the output of NAND gate 133. A first input of NAND gate 133 is coupled to the output of NAND gate 132 and to a first lead of capacitor 134, and a second input of NAND gate 133 is coupled to the second lead of capacitor 134.

The input to channel 128 comprises a node 138 and a node 140. Node 138 is coupled to the second input of NAND gate 132 (and therefore also to the output of NAND gate 133), and node 140 is coupled to the second input of NAND gate 133 (and therefore also to the second lead of capacitor 134). The output of channel 128 is formed on a node 142, which is coupled to the output of NAND gate 132 and to the first lead of capacitor 134. A trigger pulse can be applied to an input node 146, inverted by NAND gate 136, and applied to the first input of NAND gate 132 of each of the channels (such as channels 128 and 130) simultaneously.

It should be noted that the interface 14 can be a stand-alone unit as illustrated in FIG. 1, or it can be made part of another interface card such as the audio card interface 64 FIG. 1. The interface 14 can also comprise a "game" interface card provided by a number of vendors, most of which have multiple channels which would be well adapted for use with the present invention. Conventional game interface cards may include "one shot" circuitry similar to that provided by the interface of the present invention.

When the resistive network comprising the transducer element 84 and resistors 118 and 120 is coupled across the input nodes 138 and 140 of the first channel 128, a resistive-capacitive (R/C) network is created with the capacitor 134 of the first channel. Similarly, when the resistive network comprising the transducer element 86 and resistors 122 and 124 is coupled across the input nodes 138 and 140 of the second channel 130, a resistive-capacitive (R/C) network is created with the capacitor 134 of the second channel.

As will be appreciated by those skilled in the art, the channels 128 and 130 each comprise a circuit known generally as a "one shot." A one shot produces a regular square digital pulse of a duration fixed by the RC constant in response to a trigger pulse of any duration. One shots are typically used to "clean up" a pulse train by restoring fuzzy pulses that may have grown weak or spread out to uniform square digital pulses of the afore-mentioned duration fixed by the RC constant. A one shot is therefore somewhat like a signal repeater.

The duration or "width" of the output pulse is governed by the RC network, not by the input pulse width. In the present invention, the capacitance C is constant, and the resistance R of the resistance network comprising, for example, transducer element 84 and resistors 118 and 120 is variable due to the transducer element 84. In consequence, the output of the "one shot" comprising each channel is a variable width pulse having a duration that encodes the current value of the resistance of the resistance network, and therefore the force applied to the transducer element 84.

The construction and operation of "one shots" is well known to those skilled in the art. Briefly, and with reference to channel 128, a "one shot" at rest, i.e. in a stable condition will have the input at node 146 at a logic L, causing the first input to NAND gate 132 to be a logical H. The capacitor 134 is fully charged with a negative charge on the output of NAND gate 132 and a positive charge on the output of NAND gate 133. Since there is no current flowing through the resistive network, this causes a logical H to be present at the output of NAND gate 133 and at the second input to NAND gate 132, forcing a logic L at the output of NAND gate 132. This causes the first input of NAND gate 133 to be L, ensuring that the output of NAND gate 133 is H.

When a trigger pulse or signal is applied to node 146, the above-mentioned conditions change for the one-shot. With the rising edge of a trigger pulse, the logic level at node 146 rises to H, forcing the first input to NAND gate 132 L. This forces the output of NAND gate 132 H, which starts discharging the capacitor 134 because the output of NAND gate 133 is forced L due to the first input of NAND gate 133 being forced H. This allows current to flow from the capacitor 134 through the resistive network R comprising the transducer 84 and resistors 118 and 120. Since the voltage across a capacitor cannot change instantaneously, this discharging takes place over a period of time determined by the resistance of the resistance network R. When fully discharged, the polarity of the charge on the capacitor 134 is reversed from the rest state, i.e. the positive terminal of the capacitor 134 is coupled to the output of NAND gate 132.

It should be noted that, once triggered, the duration of the trigger pulse at node 146 is irrelevant, i.e. the width of the input pulse doesn't matter, as long at the trigger pulse width is less than the output of the one-shot. Once triggered, the operation of the one-shot is controlled by the RC network time constants.

Since the output of NAND gate 133 is H after being triggered by the trigger pulse, the output at node 142 is also H. It will remain H for some time after the end of the trigger pulse, because the voltage across capacitor 134 cannot change instantaneously. However, when the trigger pulse is over, the logic level at the first input of NAND gate 132 remains H because its second input is still L. When the capacitor 134 discharges sufficiently, the second input to NAND gate 133 goes L, causing the output of NAND gate 133 to go H. This causes the second input to NAND gate 132 to go H, forcing the output of NAND gate 132 to go L, finishing the cycle.

It should be noted that a trigger signal TRIGGER#1 is provided at node 146 from the digital processing system 16 to cause all of the channels of the interface 14 (e.g. channels 128 and 130) to trigger.

Figure 7:
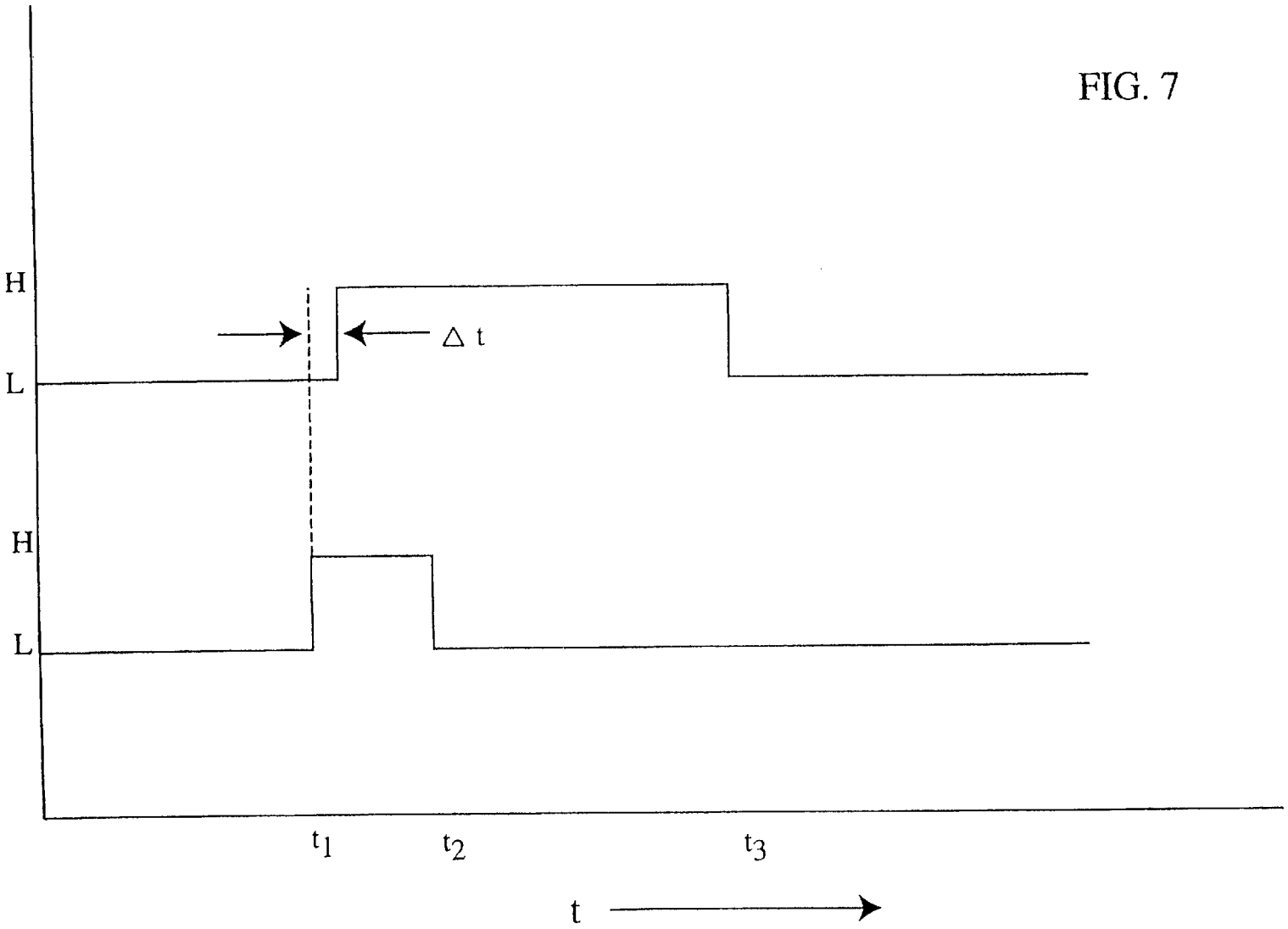
FIG. 7 is a timing diagram illustrating the operation of the circuit of FIG. 6.

FIG. 7 illustrates the relative timing of the trigger pulse at node 146 and the output at node 142. The trigger pulse begins at a time t1 with a L to H transition and, at a time t1+Δt, the output signal on node 142 goes H. The delay Δt is due to the reaction time of each NAND gate and, therefore, is quite small. Some time later, at time t2, the trigger pulse returns to L. However, as explained previously, the output at node 142 remains H until the capacitor 134 has sufficiently discharged. Finally, at a time t3 the capacitor 134 is sufficiently discharged to permit the output at node 142 to go to L. The duration or width W of the output signal is dependent upon the RC constant and, therefore, upon the resistance of the resistive network R. In other words, the onsets (i.e. the rising edges) of the input and the output pulses are virtually simultaneous (except for the aforementioned delay time Δt), but the duration or width of the output signal pulse is determined by this RC constant.

Figure 8:
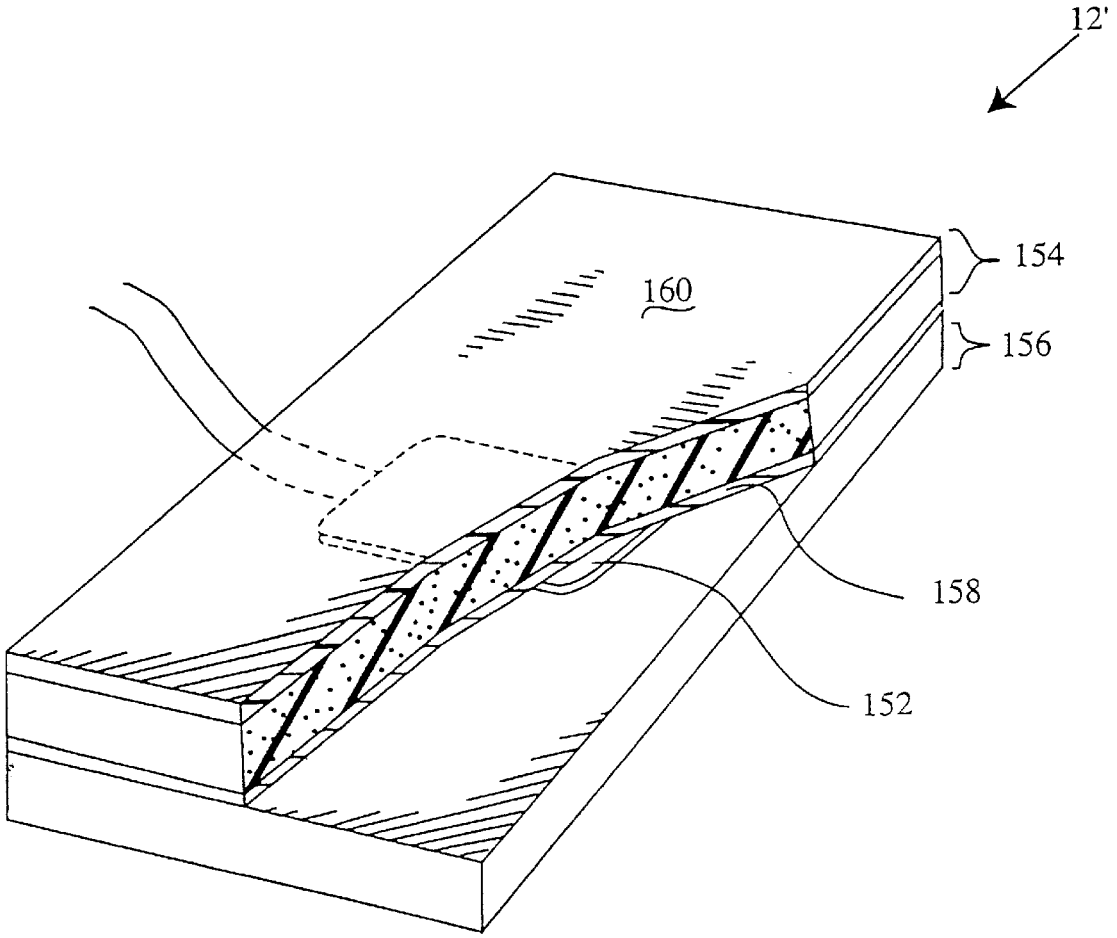
FIG. 8 is a partially broken, perspective view of an alternate embodiment for a drum pad as illustrated in FIG. 1.

In FIG. 8, an alternate embodiment for a percussion transducer 12' is illustrated. In this alternate embodiment, a single transducer element 152 is sandwiched between a first elastomeric member 154 and a second elastomeric member 156. The first elastomeric member 154 is very similar in construction to the first elastomeric member 24 described previously. Likewise, the second elastomeric member 156 is very similar in construction to the second elastomeric member 26 described previously. However, embodiment 12' includes an additional or intermediate member 158 made, for example, from a stiff non-resilient material such as sheet aluminum or steel. This intermediate member 158 is preferably of the same shape and size as the first elastomeric member 154 and the second elastomeric member 156. This intermediate member 158 therefore mechanically couples the bottom surface of first elastomeric member 154 to the upper surface of the transducer element 152.

The percussion transducer 12' of FIG. 8 is advantageous in that only a small transducer element 152 is required to detect percussions on a large upper surface of the transducer 12'. Force applied to virtually any position on the upper surface 160 of the percussion transducer 12' is mechanically coupled through the first elastomeric member 154 and the intermediate member 158 to the transducer 152.

Yet another embodiment of the present invention has two small transducer elements similar to the transducer element 152 and two slightly separated intermediate members similar to the intermediate member 158 to thereby provide a dual channel input. Such an embodiment would be a direct replacement for the percussion transducer 12 of FIG. 2.

Figure 9:
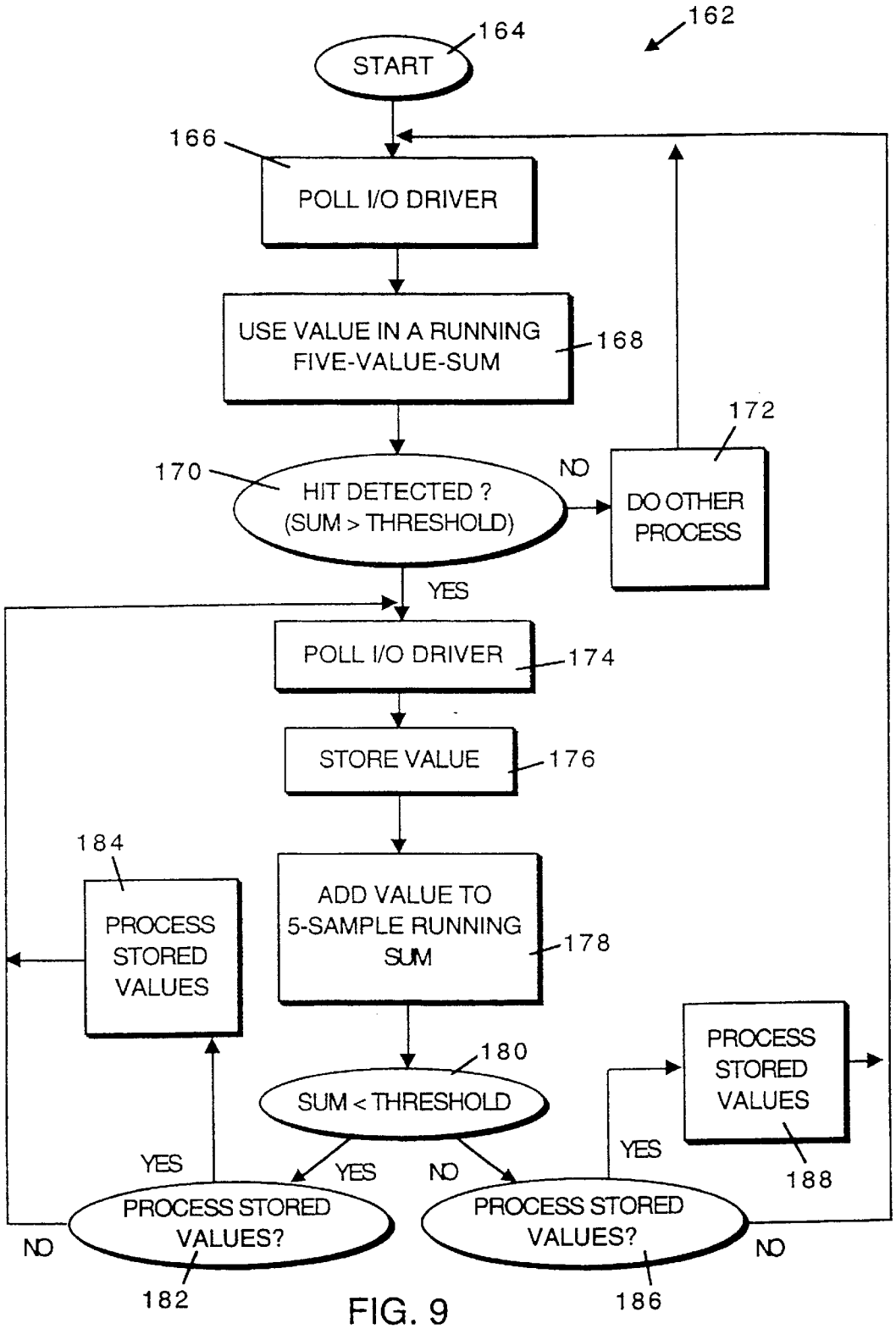
FIG. 9 is a flow diagram of a computer implemented process in accordance with the present invention that is running on the personal computer system of FIG. 1.

In FIG. 9, a computer implemented process 162 is used to interpret the data provided at the nodes 142 of the drum pad interface 14. The process 162 begins at 164 and, in a first step 166, the I/O driver to the drum pad interface 14 is polled for data. This polling step returns a value between 0 and 400 (in the present example) which represents the force being applied to a transducer element. Next, in a step 168, the value provided by the drum pad interface (which is between 0 and 400) is used in a running 5 value sum. In a step 170, it is determined whether this running 5 value sum is greater than a threshold value THRESH_A, i.e., if a "hit" is detected. A suitable value for THRESH_A can be about 500. The reason for using a 5-value sum is to reduce the effect of noise, i.e., values appearing on the output nodes 142 due to noise factors. If a "hit" is not detected, a step 172 allows other computer processes to be accomplished and then returns to step 166 to once again poll the I/O driver. The I/O driver is usually polled by step 166 approximately every 2 or 3 milliseconds.

If step 170 determines that a "hit" is detected, i.e., the running 5 value sum is greater than THRESH_A, the I/O driver is once again polled in a step 174. The new polled value is then stored in RAM 40 in a step 176, and this stored value forms a part of a new 5 sample running sum in a step 178. If this 5 sample running sum is less than a second threshold THRESH_B, a step 180 turns over the process control to step 182 which determines whether the stored values should be processed, i.e. "processed on the fly." If they are to be processed, a step 184 does the processing (such as producing a sound on a speaker 46 or 66, or a visual display on a monitor 74), and process control is returned to step 174. Process control also returns to step 174 if stored values are not to be processed "on the fly" as determined by step 182.

If step 180 determines that the sum is not less than THRESH_B, a step 186 determines whether the stored value should be processed. If yes, the stored values are processed in a step 188 in a similar fashion that they were processed in a step 184. Upon a negative determination by step 186, or after the completion of step 188, process control is returned to step 166.

Figures 10, 11:
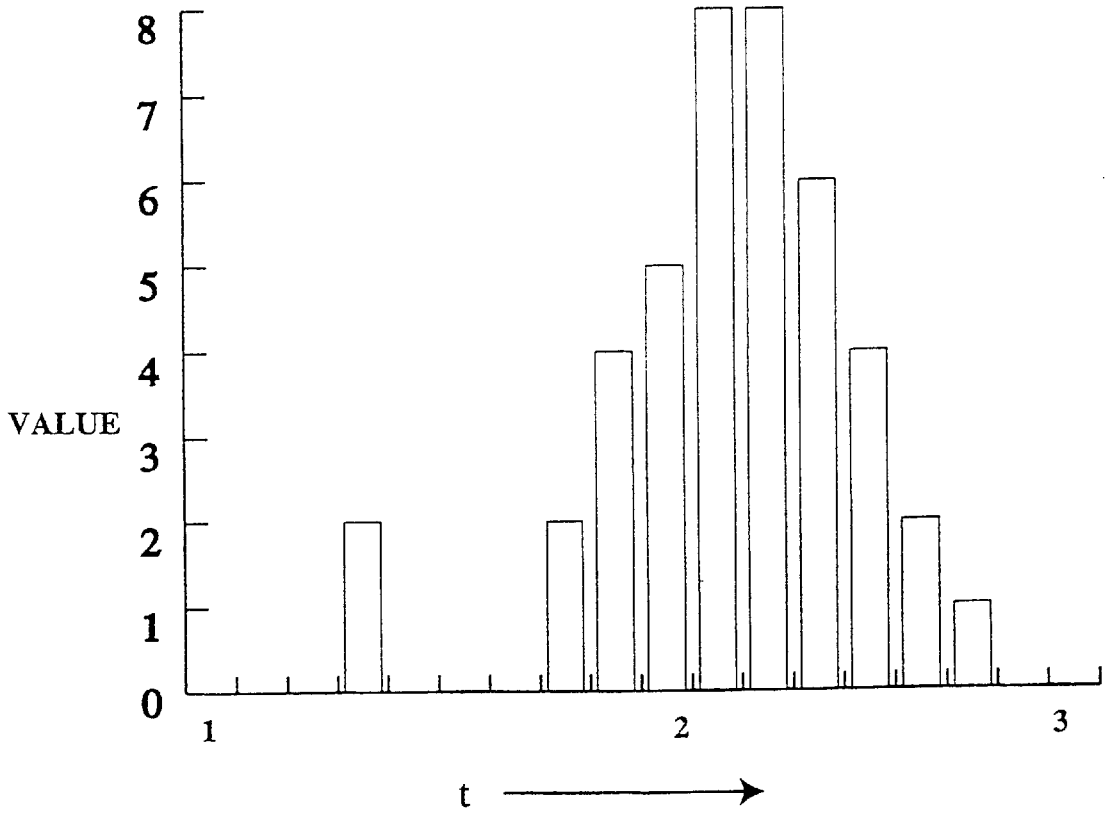
FIG. 10 is a diagram of a memory register (MR) of the personal computer of FIG. 1.
FIG. 11 is a diagram illustrating a series of force values generated by the present invention.

FIG. 10 illustrates a memory register (MR) stored within RAM 40 of the digital processing system 16. This MR position, in theory, can by anywhere in RAM 40, but is often set by convention in the I/O address space of the digital processing system 16. More particularly, a conventional IBM compatible personal computer (PC) Basic Input/Output System (BIOS) provides a convenient MR memory location at $201 (hexadecimal address 201).

In the present embodiment, the memory register MR is 8 bits long. Bits 0 and 1 are used to store the output of the two channels of the drum pad interface 14 that were placed on the databus by the I/O channel interface 42. In alternate embodiments, more of the bits can be used for additional channels. For example, in a four channel embodiment for the drum pad interface 14, bits 0, 1, 2, and 3 can be used. However, in this present embodiment, the contents of bits 2–7 are "don't cares" and can be ignored.

As mentioned previously, in this present embodiment, the output of the two channels 128 and 130 of the drum pad interface 14 are stored in bit positions 0 and 1, respectively, of the memory register (MR). The contents of these bits will be either 0 or 1 dependent upon the output on node 142 of the respective channel. In the present embodiment, these bits of memory register MR each constitute a time varying digital signal, a pulse whose duration depends on the force applied to the associated transducer element 84 or 86. By detecting when each of these I/O bits changes from a 1 to a 0, the I/O driver software in FIG. 12 measures the force applied to the corresponding transducer elements 84 and 86. If no force is applied, the pulse width is maximal.

FIG. 11 illustrates a series of digital numeric values produced by the "Poll I/O Driver" steps 166 and 174 of process 162 illustrated in FIG. 9. Here, arbitrary time intervals designated by 1, 2, 3, 4 represent regular time periods, e.g., 1–2 milliseconds. At time period 4, a spurious signal occurs. Then, starting at time period 8, a gradually rising then gradually falling series of values are produced representing a percussive "hit" against a transducer element of the present invention. FIGS. 10 and 11 will be used to describe steps 166/174 in FIG. 12.

Figure 12:
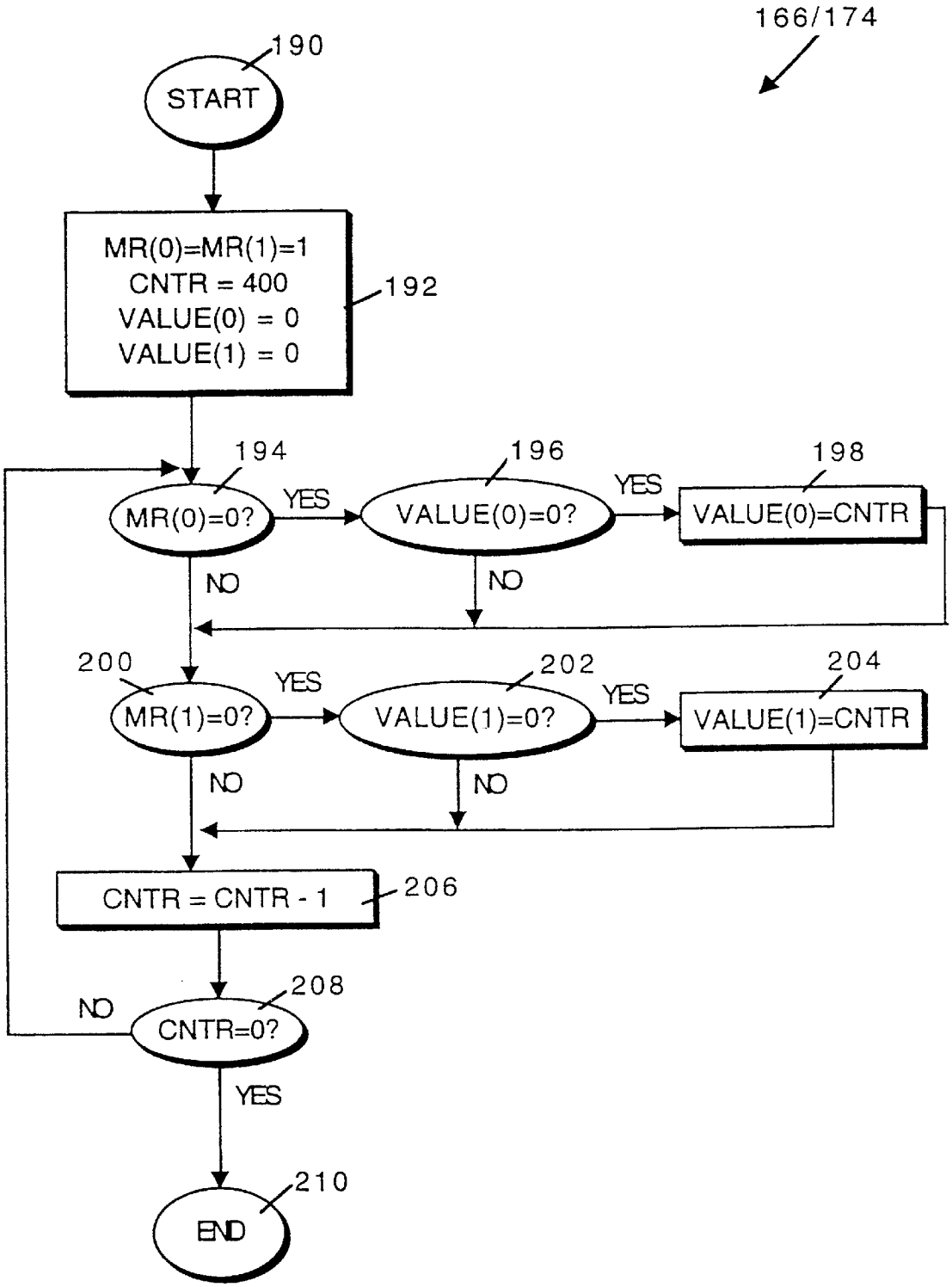
FIG. 12 is a computer implemented process of the present invention running on a personal computer illustrated in FIG. 1 which is used to poll the dram pad interface and produce the force values illustrated in FIG. 11.

In FIG. 12, a flow diagram of the steps 166 and 174 of FIG. 9 is illustrated in greater detail. The process 166/174 begins at 190 and, in a step 192, the first bits of memory register 0 and memory register 1 are set to 1, i.e., MR(0)=MR(1)=1. A counter CNTR is set to 400, and a value associated with memory register bit 0 and a value associated with memory register bit 1 are set to 0, i.e., VALUE(0)=0 and VALUE(1)=0.

Next, in a step 194, it is determined whether MR(0)=0. If it is, it is tested in a step 196 whether VALUE(0) is still zero. This step 196 essentially tests to see if this is the first time during the current count cycle that MR(0) was set to 0. If step 196 determines that VALUE(0)=0, VALUE(0) is set to CNTR in a step 198. Therefore, the first time that the bit 0 toggles from 1 to 0 during a particular count cycle, the counter level CNTR is stored into the variable VALUE(0) by a step 198. If in step 194 it is determined that MR(0)≠0, or if in step 196 it is determined that VALUE(0)≠0, or upon completion of step 198, process control is passed to a step 200.

In step 200, it is determined whether MR(1)=0. If the memory register bit 1 MR (1)=0, a step 202 determines if it is the first time that this bit has toggled to 0 during the first count cycle by comparing VALUE(1) to 0. If VALUE(1) has not changed from zero, a step 204 sets the value of VALUE (1) to CNTR. If in step 200 it is determined that MR(1)≠0, or if in step 202 it is determined that VALUE(1)≠0, or upon completion of step 204, process control is passed to a step 206, which is discussed in detail later.

Therefore the steps 194 to 198 determine the trailing edge of a pulse whose width encodes the force on a transducer element 84, and steps 200/204 determine the duration of a pulse encoding the force on a transducer element 86. Of course, if there are other channels, steps similar to the sequence 194/198 and to the sequence 200/204 can be added for each of those channels.

After the completion of the appropriate steps 194/204 the variable CNTR is decremented by 1 in a step 206. Next, in a step 208, the value of CNTR is compared to 0, and if it is not equal to 0, process control is returned to step 194 to execute the loop 194/208 again. If CNTR=0, the polling cycle is over and the process is completed as indicated at 210.

It should be noted that the counter value 400 is arbitrary and is determined by a number of system parameters, such as CPU speed, driver speed, etc. By providing a counter cycle of 400, the polling cycle of process 166/174 takes approximately 1–2 milliseconds. This polling cycle is, of course, dependent upon the processor type and clock speed of the computer system. The effect of the loop comprising steps 194 to 208 is to provide a value for each channel which is in the range of 0–400. A value closer to 400 will indicate greater force because it will indicate that the RC network described previously had charged very quickly. A value for a channel closer to 0 will indicate a lighter force because the RC network charged very slowly.

Using the context of FIGS. 10–12, the process 162 of FIG. 9 will now be explained in terms of an example. The example used will be the data illustrated in FIG. 11.

In FIG. 9, when step 166 polls the I/O driver at a time period 1 as illustrated in FIG. 11, a value of 0 is returned and is added to a running 5 value sum. Step 170 determines that no "hit" is detected and other processes are executed in step 172. These other processes can be other processes of the current computer implemented process of the present invention, or it can be concurrent processes of the digital processing system 16. When at time period 4 a small noise or "glitch" value is returned by the poll, this value is added to the running 5 value sum in step 168, but the sum is still lower than the threshold THRESH_A as determined by step 170. The loop of step 166/172 is continued until a 5 value sum that is greater than THRESH_A is detected. In the present example, this 5 value sum probably would occur at about time period 10 or 11 where the values at time periods 8, 9, 10 or 8, 9, 10, and 11 produce a running 5-value sum which is greater than the threshold THRESH_A. By 5 value sum it is meant, of course, the sum of the current time period value returned by the polling step and the preceding 4 time period values returned by the previous four polling steps. Of course, this 5 value sum is somewhat arbitrary, and could equally well be a 3 value sum or a 10 value sum in other embodiments of the present invention. The purpose of the 5 value sum, however, is to eliminate noise such as the noise produced at time period 4 in FIG. 11.

When a "hit" is detected by step 174, the I/O driver is again polled. Let us say, in this example, that the 5 value sum at time period 10 creates a hit detection, and then the step 174 polls the I/O driver to produce the value at time period 11. This value is stored in step 176 and is added to a 5 sample running sum at step 178. This is a new 5 sample running sum independent of the 5-value running sum of step 168. Next, it is determined whether the sum is less than the second threshold THRESH_B. A typical value for THRESH_B is 300. If it is not, there is still substantial force being applied to the force transducer element. It is then determined in step 182 whether the stored values should be processed before the end of the current percussive "hit", i.e. "on the fly." If yes, step 184 performs its processing.

The step 184 will have one or more values to process as a result of the "store value" in step 176. In many instances, it will have 20–100 values to process. This processing can be used to produce a drum sound on a speaker 46 or 66 by providing the appropriate output circuitry with information such as duration of the sound, tone, quality of the sound, the sound envelope, etc., as it is well known to those skilled in the art. Alternatively, the stored values can be processed to provide a visual output on monitor 80 by procedures once again well known to those skilled in the art. A still further option is to continue to store these values (perhaps to a more permanent store such as a hard disk) for later playback. In any event, the "PROCESS STORED VALUES" step 184 will utilize standard signal processing techniques to provide a user discernible feedback or output either immediately or on a delayed basis.

If step 182 indicates that the stored value should not be processed "on the fly," the stored values will remain stored, but unused until the 5 sample running sum is not less than THRESH_B. At this time, it is determined by step 186 if the stored value should be processed. If so, the stored values are processed in the step 188, which is of the same nature as the "PROCESS STORED VALUE" step 184 described previously.

While this invention has been described in terms of several preferred embodiments, there are alterations, permutations, and equivalents which fall within the scope of this invention. It should also be noted that there are many alternative and equivalent ways of implementing both the process and apparatus of the present invention. Furthermore, although the drum pad of the present invention has been presented as a musical instrument, it can also be used for other input purposes. For this reason, the "drum pad" of the present invention is intended to be considered an analog triggering device that uses a musical (drum) metaphor. Besides being useful in musical application or drum playing games, there are other games for which such an input device could be used. For example, a popular arcade game is the Whack-A-Mole game, where mole heads pop out of mole holes to be hit on the head with a soft rubber mallet. A computerized version of this game could present the images of mole heads popping out of mole holes on a computer screen, and the drum pad could be used as an analog input pad to "hit" the mole on its head. A hammer could be depicted on screen in response to the mole head hit. Another non-musical use for the drum pad of the present invention is simply as an activator, such as for switching "slides" in a computerized slide show. For example, the drum pad could be built into a lectern and lecturers could present their next slide by tapping on the drum pad with their hands. Yet another use for the pad of the present invention is to place it on a floor surface to be jumped or jogged upon during an exercise activity (such as running in place), where software running on the computer system can compute distance run, calories burned, etc.

It is therefore intended that the following appended claims be interpreted as including all such alterations, permutations, equivalents, and alternate uses as fall within the true spirit and scope of the present invention.

What is claimed is:

1. A percussion system comprising:

at least one force transducer developing a variable resistance output based upon a percussive force exerted upon a surface thereof;

an interface having at least at least one input and at least one output, said input being coupled to said output of said force transducer, said interface having a capacitive member coupled to said input such that said force transducer and said capacitive member together form an RC circuit, and means responsive to said RC circuit and operative to produce an output signal on said at least one output of said interface which is responsive to said percussive force exerted on said surface of said force transducer; and a digital processing system including memory means, said digital processing system being coupled to said output of said interface such that a digital value at said output can be stored in a memory location of said memory means, whereby said value at said memory location is reflective of said percussive force being exerted on said surface of said force transducer.

2. A percussion system as recited in claim [1] *1* wherein said force transducer is one of a plurality of force transducers, and wherein said interface has a plurality of inputs and corresponding plurality of outputs, where each input is coupled to an output of a force transducer and to a capacitive member to form an RC circuit, and means responsive to each RC circuit to produce an output signal on an associated output of said interface.

3. A percussion system as recited in claim 1 wherein said means responsive to said RC circuit comprises a one-shot circuit.

4. A percussion system as recited in claim 3 wherein said one-shot circuit includes a first NAND gate and a second NAND gate, where a first input of said first NAND gate is coupled to a trigger input, a second input of said first NAND gate is coupled to an output of said second NAND gate, a first input of said second NAND gate is coupled to an output of said first NAND gate, a second input of said second NAND gate is coupled to a node between said capacitive member and said force transducer, said digital output being provided at said output of said first NAND gate.

5. A percussion system as recited in claim 4 wherein said capacitive member is further coupled to said output of said first NAND gate, and said force transducer is further coupled to said output of said second NAND gate.

6. A percussion system as recited in claim 1 wherein said force transducer comprises:

a transducer element; and an elastomeric member having an upper surface and a lower surface, said transducer element being mechanically coupled to said lower surface, said elastomeric member having a consistency that transmits forces applied to said upper surface to said lower surface with a substantially linear response.

7. A percussion system as recited in claim 6 wherein said elastomeric member is a first elastomeric member, and wherein said force transducer further includes a second elastomeric member having an upper surface and a lower surface, said transducer element being mechanically coupled to said upper surface of said second elastomeric member, whereby said transducer element is sandwiched between said first elastomeric member and said second elastomeric member.

8. A percussion system as recited in claim 6 wherein said interface further includes a trigger input coupled to said digital processing system, whereby said RC circuit can be triggered by said digital processing system.

9. A percussion system as recited in claim 6 further comprising an output transducer coupled to said digital processing system which is operative to develop an auditory signal in at least partial response to said value stored in said memory location.

10. A percussion input device for personal computer systems comprising:

a percussion transducer element having an upper surface and a lower surface and a pair of nodes, wherein a signal developed at said pair of nodes is dependent upon a percussive force applied to substantially any portion of said upper surface without regard to the location of said percussive force on said upper surface;

an elastomeric member having an upper section with an upper surface coupled to a lower section with a lower surface, said upper surface of said transducer element being responsive to percussive forces transmitted to said lower surface of said elastomeric member from said upper surface of said elastomeric member, said transducer element being mechanically coupled to said lower surface of said elastomeric member, said elastomeric member having a consistency that transmits percussive forces to said transducer element with a substantially linear response, said upper surface providing a good surface for a mouse-type pointing device to engage and move across, said lower section being made of a resilient material;

a cable having a plurality of mutually insulated conducting wires, wherein first ends of a pair of said wires are coupled to said pair of nodes; and a connector having a plurality of conductive connector means, wherein two of said connector means are coupled to second ends of said pair of wires, and whereby said cable and said connector are operable to input said signal to a personal computer system.

11. A percussion input device as recited in claim 10 wherein said plurality of conductive connector means include conductive pins.

12. A percussion input device as recited in claim 10 wherein said elastomeric member is a first elastomeric member, and further comprising a second elastomeric member that is shaped similarly to said first elastomeric member and having an upper surface and a lower surface, said lower surface of said transducer element being supported by said upper surface of said second elastomeric member such that said transducer element is sandwiched between said first elastomeric member and said second elastomeric member, said lower surface of said second elastomeric member having a surface which provides a good frictional engagement with a supporting surface.

13. A percussion input device as recited in claim 12 wherein said transducer element is one of a plurality of transducer elements sandwiched between said first elastomeric member and said second elastomeric member.

14. A percussion input device as recited in claim 12 further comprising an intermediate member shaped similarly to said first elastomeric member and said second elastomeric member, said intermediate member being less resilient than said lower section of said first elastomeric member and positioned between said first elastomeric member and said transducer element, thereby mechanically coupling said transducer element to said lower surface of said first elastomeric member.

15. A percussion input device as recited in claim 12 wherein said first elastomeric member and said second elastomeric member are adhesively coupled together.

16. A percussion input device as recited in claim 12 wherein said first elastomeric member and said second elastomeric members are substantially rectangular in shape.

17. A percussion input device as recited in claim 16 wherein said first elastomeric member and said second elastomeric members have a pair of opposing, parallel shorter sides at least 6 inches in length and a pair of opposing, parallel longer sides at least 7 inches in length.

18. A percussion input device as recited in claim 17 wherein the corners of said first elastomeric member and said second elastomeric members are rounded to lessen chance of corner engagement of said first elastomeric member and said second elastomeric member with said mouse and a hand of a person manipulating said mouse over said upper surface of said first elastomeric member.

19. A percussion input device as recited in claim 12 wherein said transducer element has a variable resistance between said pair of nodes dependent upon said force applied to said upper surface of said transducer element.

20. A percussion input device as recited in claim 19 further comprising parallel resistor means coupled between said pair of nodes.

21. A percussion input device as recited in claim 20 further comprising series resistor means coupled in series to at least one of said pair of nodes.

22. A percussion input device as recited in claim 21 wherein at least one of said parallel resistor means and said series resistor means is located within said connector.

23. A percussion input device as recited in claim 21 wherein said plurality of conductive connector means includes a first conductive pin and a second conductive pin, wherein said series resistor means has a first end coupled to a first node of said pair of nodes and a second end coupled to said first conductive pin, and wherein said second conductive pin is coupled to a second node of said pair of nodes.

24. A percussion system comprising:

a computer system having an input/output (I/O) bus and a plurality of memory locations;

a percussion input device operative to develop an analog output signal in response to a percussive force being applied to a percussion surface, wherein said signal is developed without regard to the location of said percussive force on said percussion surface;

an interface having an input coupled to said analog output signal of said percussion input device, said interface providing a interface output signal of said analog output signal and being operative to place said interface output signal on said I/O bus;

means for storing said interface output signal that is on said I/O bus in a designated memory location of said computer system;

means for detecting a change in said designated memory location corresponding to a force being applied to said percussion input device; and means for providing a computer system implemented result upon said detection of a change in said designated memory location.

25. A percussion system comprising:

a computer system having an input/output (I/O) bus and a plurality of memory locations;

a percussion input device operative to develop an analog output signal in response to a force being applied to a percussion surface;

an interface having an input coupled to said analog output signal of said percussion input device, said interface providing a interface output signal of said analog output signal and being operative to place said interface output signal on said I/O bus;

means for storing said interface output signal that is on said I/O bus in a designated memory location of said computer system;

means for detecting a change in said designated memory location corresponding to a force being applied to said percussion input device, said means for detecting a change including a computer implemented process having the steps of (a) initializing a current count value which is used to count to a count limit;

(b) detecting a change in at least one bit of said designated memory location corresponding to a force being exerted on said percussion input device;

(c) assigning said current count value to a percussion value if a change is detected in said at least one bit for the first time since step (a) was last performed; and (d) repeating steps (b) and (c) until the current count is at said count limit; and means for providing a computer system implemented result upon said detection of a change in said designated memory location.

26. A percussion system as recited in claim 25 wherein said means for providing a computer implemented result comprises a computer implemented process including:

collecting a plurality of percussion values developed by said means for detecting a change;

processing said plurality of percussion values to produce a processed resultant; and developing a user-discernible output based upon said processed resultant.

27. A percussion system as recited in claim 26 wherein said user-discernible output is auditory.

28. A percussion system as recited in claim 27 wherein said user-discernible output is visual.

29. A percussion system as recited in claim 27 wherein said user-discernible output is delayed by storing said user-discernible output for subsequent output from said system.

*30. A percussion input device for personal computer systems comprising:*

*a percussion transducer element having an upper surface and a lower surface, wherein said percussion transducer element is operative to develop an output signal which is dependent upon a percussive force applied to substantially any portion of said upper surface;*

*an elastomeric member having an upper section with an upper surface coupled to a lower section with a lower surface, said upper surface of said transducer element being responsive to percussive forces transmitted to said lower surface of said elastomeric member from said upper surface of said elastomeric member, said transducer element being mechanically coupled to said lower surface of said elastomeric member, said elastomeric member having a consistency that transmits percussive forces to said transducer element, said upper surface providing a good frictional surface for a mouse-type pointing device to engage and move across, said lower section being made of a resilient material; and*

*an interface operative to couple said output signal of said transducer element to a personal computer system;*

*whereby said output signal may be input to a personal computer system.*

*31. A percussion input device as recited in claim 30 wherein said elastomeric member includes an upper section that is made from a material that provides an upper surface that is well adapted for engagement with both a mouse and a drumstick.*

*32. A percussion input device as recited in claim 30 wherein said percussion transducer element is operative to develop a signal which is dependent upon a percussive force applied to substantially any portion of said upper surface without regard to the location of said percussive force on said upper surface.*

*33. A percussion system comprising:*

*a computer system having an input/output (I/O) bus and a plurality of memory locations;*

*a percussion transducer element having an upper surface and a lower surface, wherein said percussion transducer element is operative to develop an output signal which is dependent upon a percussive force applied to substantially any portion of said upper surface;*

*an elastomeric member having an upper section with an upper surface coupled to a lower section with a lower surface, said upper surface of said transducer element being responsive to percussive forces transmitted to said lower surface of said elastomeric member from said upper surface of said elastomeric member, said transducer element being mechanically coupled to said lower surface of said elastomeric member, said elastomeric member having a consistency that transmits percussive forces to said transducer element, said upper surface providing a good frictional surface for a mouse-type pointing device to engage and move across, said lower section being made of a resilient material; and*

*an interface operative to place said output signal of said percussion transducer element on said I/O bus of said computer system;*

*whereby said output signal that is on said I/O bus may be stored in a designated memory location of said computer system.*

*34. A percussion system as recited in claim 33 wherein said percussion transducer element is operative to develop a signal which is dependent upon a percussive force applied to substantially any portion of said upper surface without regard to the location of said percussive force on said upper surface.*

*35. A percussion system as recited in claim 33 further including a mouse-type pointing device interfaced to said computer system, said mouse-type interface having a rolling ball element operative to frictionally engage said upper surface of said elastomeric member.*

*36. A percussion system as recited in claim 33 further including a pair of drum sticks operative to apply said percussive force upon said upper surface.*

* * * * *